United States Patent
Chiang

[19]
[11] Patent Number: 5,944,230
[45] Date of Patent: Aug. 31, 1999

[54] POWDERED MILK MEASURING CONTAINER

[76] Inventor: Kuo-Chin Chiang, 58, Ma Yuan West St., Taichung, Taiwan

[21] Appl. No.: 09/208,932

[22] Filed: Dec. 8, 1998

Related U.S. Application Data

[63] Continuation-in-part of application No. 08/933,615, Aug. 28, 1997, abandoned.

[51] Int. Cl.⁶ ...................................................... G01F 11/46
[52] U.S. Cl. ........................................... 222/158; 222/450
[58] Field of Search .................................... 222/158, 444, 222/454, 456, 450

[56] References Cited

U.S. PATENT DOCUMENTS

| | | | |
|---|---|---|---|
| 4,961,521 | 10/1990 | Eckman | 222/158 |
| 5,588,563 | 12/1996 | Liu | 222/158 |
| 5,667,106 | 9/1997 | Robbins, III | 222/158 |
| 5,667,109 | 9/1997 | Yu-Mei | 222/456 |

*Primary Examiner*—Philippe Derakshani

[57] ABSTRACT

A powdered milk measuring container has a base dish, a hollow vessel disposed on the base dish, a hollow cylinder disposed on the hollow vessel, a control device disposed in the hollow cylinder, a measuring bottle enclosing the hollow cylinder, and a cover covering the measuring bottle.

2 Claims, 5 Drawing Sheets

FIG·3

POWDERED MILK MEASURING CONTAINER

The present invention is a continuation-in-part of application Ser. No. 08/933,615, filed Aug. 28, 1997, now abandoned.

BACKGROUND OF THE INVENTION

The present invention relates to a powdered milk measuring container. More particularly, the present invention relates to a powdered milk measuring container which can measure a quantity of milk powders.

A user has to use a spoon to measure a quantity of milk powders. However, the quantity of milk powders in a spoon is varied everytime.

SUMMARY OF THE INVENTION

An object of the present invention is to provide a powdered milk measuring container which can measure a quantity of milk powders precisely.

Accordingly, a powdered milk measuring container comprises a base dish, a hollow vessel disposed on the base dish, a hollow cylinder disposed on the hollow vessel, a control device disposed in the hollow cylinder, a measuring bottle enclosing the hollow cylinder, and a cover covering the measuring bottle. The base dish has an internal periphery thread. The hollow vessel has an external periphery thread on a bottom of the hollow vessel engaging with the internal periphery thread, an outer threaded mouth on a top portion of the hollow vessel, and an interior. The control device has a bottom ring, a lateral plate, and an upper plate having a notch. The hollow cylinder has a lid, a slot formed on the lid, a recess hole formed on the lid, a protruded post disposed on the lid, a clip dent formed on an outer periphery of the hollow cylinder, a nick formed on the outer periphery of the hollow cylinder, and an inner threaded bottom having a groove. The measuring bottle has a bottle mouth, a spiral column, a recess, an elastic plate, a clip block, and a hook extended from the elastic plate. The cover has an inner sleeve, a bottom flange, and two swivel buttons. The groove receives the lateral plate. The inner threaded bottom engages with the outer threaded mouth. The protruded post is inserted in the recess. The hook engages with the clip dent. The clip block engages with the nick.

DETAILED DESCRIPTION OF THE INVENTION

Figure 1:
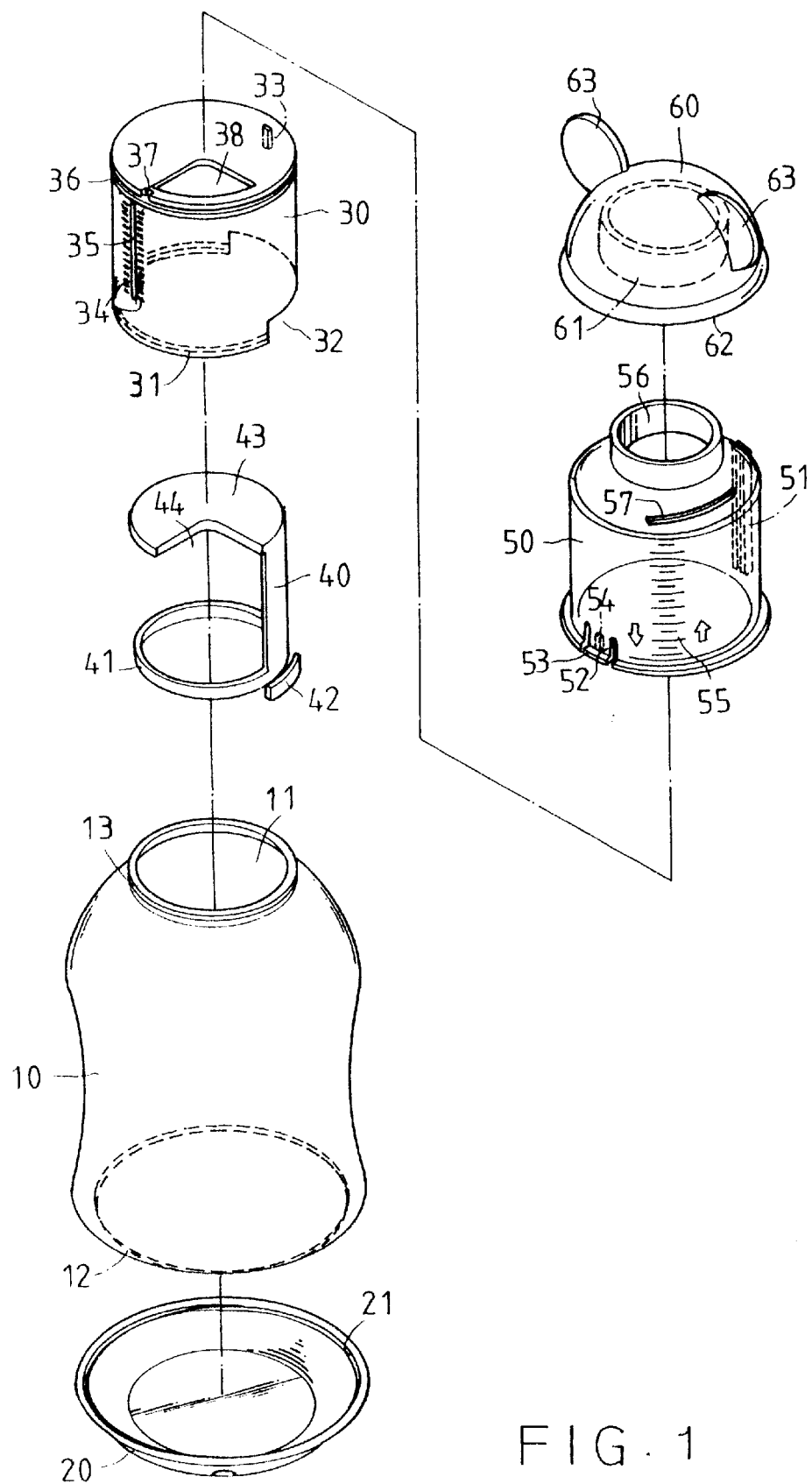
FIG. 1 is a perspective exploded view of a powdered milk measuring container of a preferred embodiment in accordance with the present invention.
Figures 2, 2A:
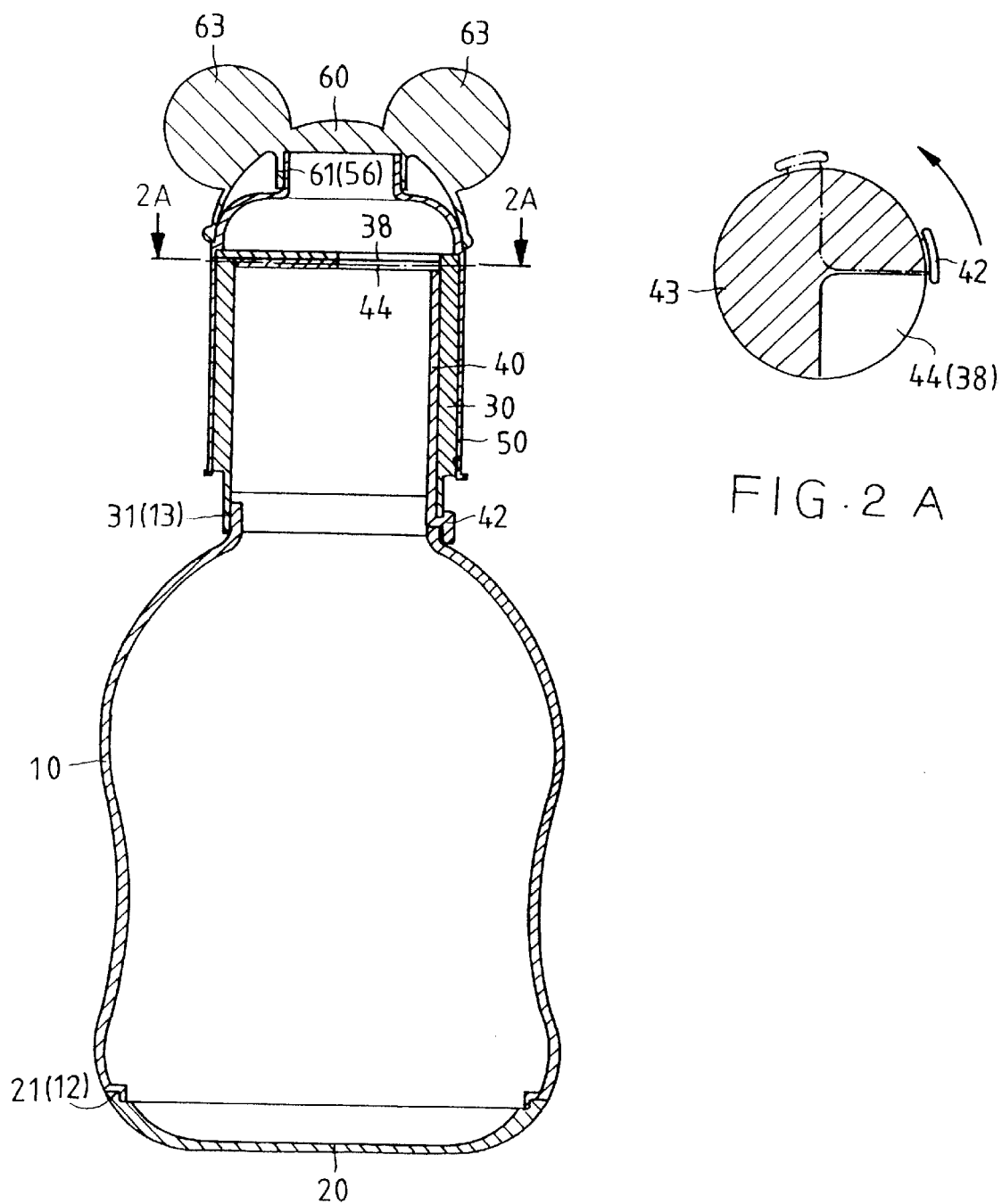
FIG. 2 is a sectional assembly view of a powdered milk measuring container of a preferred embodiment in accordance with the present invention.
FIG. 2A is a sectional view taken along line 2A—2A of FIG. 2.
Figure 3:
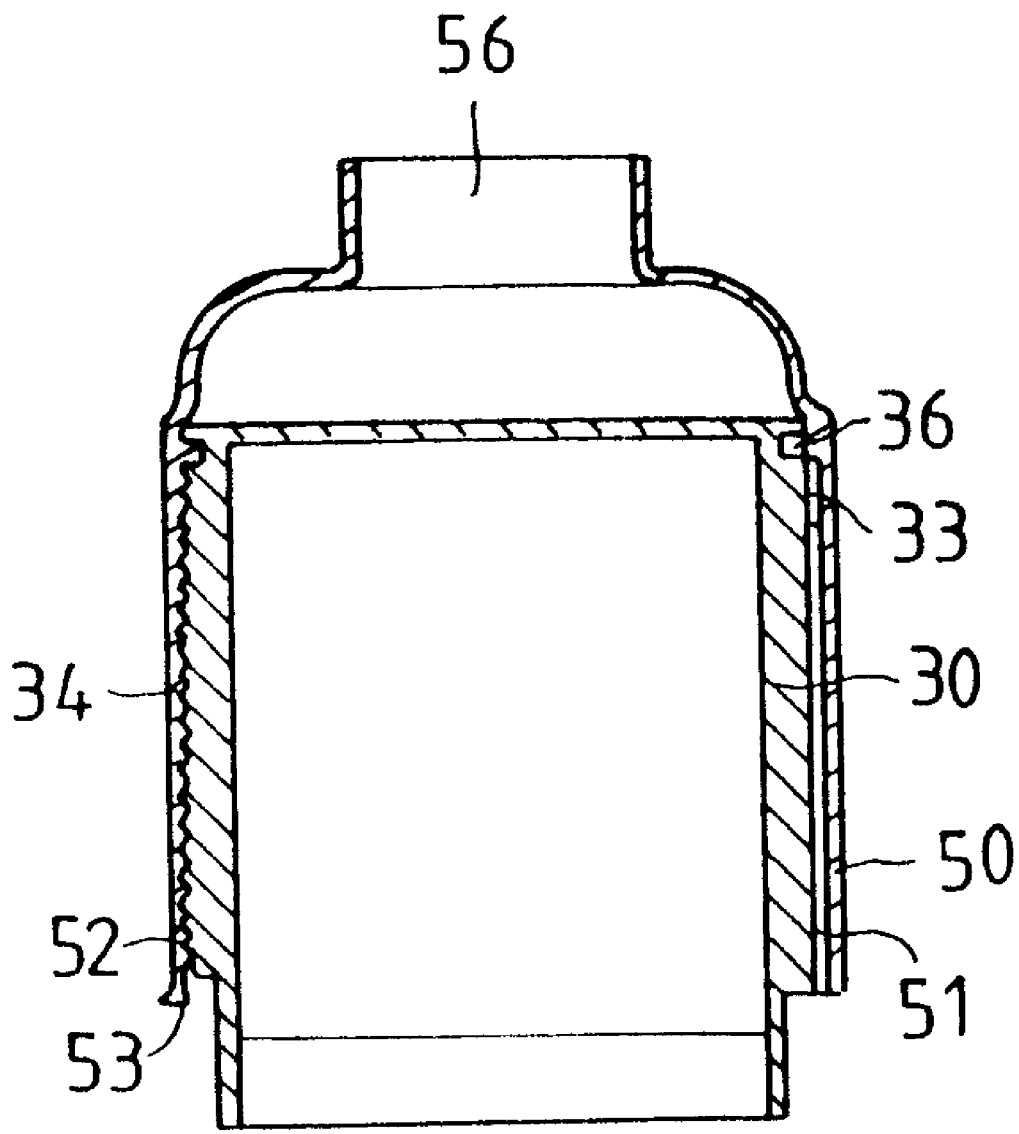
FIG. 3 is a sectional assembly view of a measuring bottle and a hollow cylinder.

Referring to FIGS. 1 to 5, a powdered milk measuring container comprises a base dish 20, a hollow vessel 10 disposed on the base dish 20, a hollow cylinder 30 disposed on the hollow vessel 10, a control device 40 disposed in the hollow cylinder 30, a measuring bottle 50 enclosing the hollow cylinder 30, and a cover 60 covering the measuring bottle 50.

The base dish 20 has an internal periphery thread 21. The hollow vessel 10 has an external periphery thread 12 on a bottom of the hollow vessel 10 engaging with the internal periphery thread 21, an outer threaded mouth 13 on a top portion of the hollow vessel 10, and an interior 11 receiving milk powders. The control device 40 has a bottom ring 41, a lateral plate 42, and an upper plate 43 having a notch 44. The hollow cylinder 30 has a lid 36, a slot 38 formed on the lid 36, a recess hole 37 formed on the lid 36, a protruded post 33 disposed on the lid 36, a clip dent 34 formed on an outer periphery of the hollow cylinder 30, a nick 35 formed on the outer periphery of the hollow cylinder 30, and an inner threaded bottom 31 having a groove 32. The measuring bottle 50 has a bottle mouth 56, a spiral column 57, a recess 51, an elastic plate 52, a clip block 54, and a hook 53 extended from the elastic plate 52. The cover 60 has an inner sleeve 61, a bottom flange 62, and two swivel buttons 63. A graduation 55 is formed on the measuring bottle 50.

The groove 32 receives the lateral plate 42. The inner threaded bottom 31 engages with the outer threaded mouth 13. The protruded post 33 is inserted in the recess 51. The hook 53 engages with the clip dent 34. The clip block 54 engages with the nick 35. The bottle mouth 56 is inserted in the inner sleeve 61.

The user can rotate the lateral plate 42 so that the notch 44 communicates with the slot 38 while the milk powders in the hollow vessel 10 are poured into the measuring bottle 50. After a predetermined amount of milk powders is poured into the measuring bottle 50, the user can rotate the lateral plate 42 so that the upper plate 43 blocks the slot 38 in order to block the milk powders in the hollow vessel 10 from flowing into the measuring bottle 50. A predetermined amount of milk powders remains in the measuring bottle 50. The predetermined amount of milk powders can be measured by the measuring bottle 50.

Figures 5, 5A:
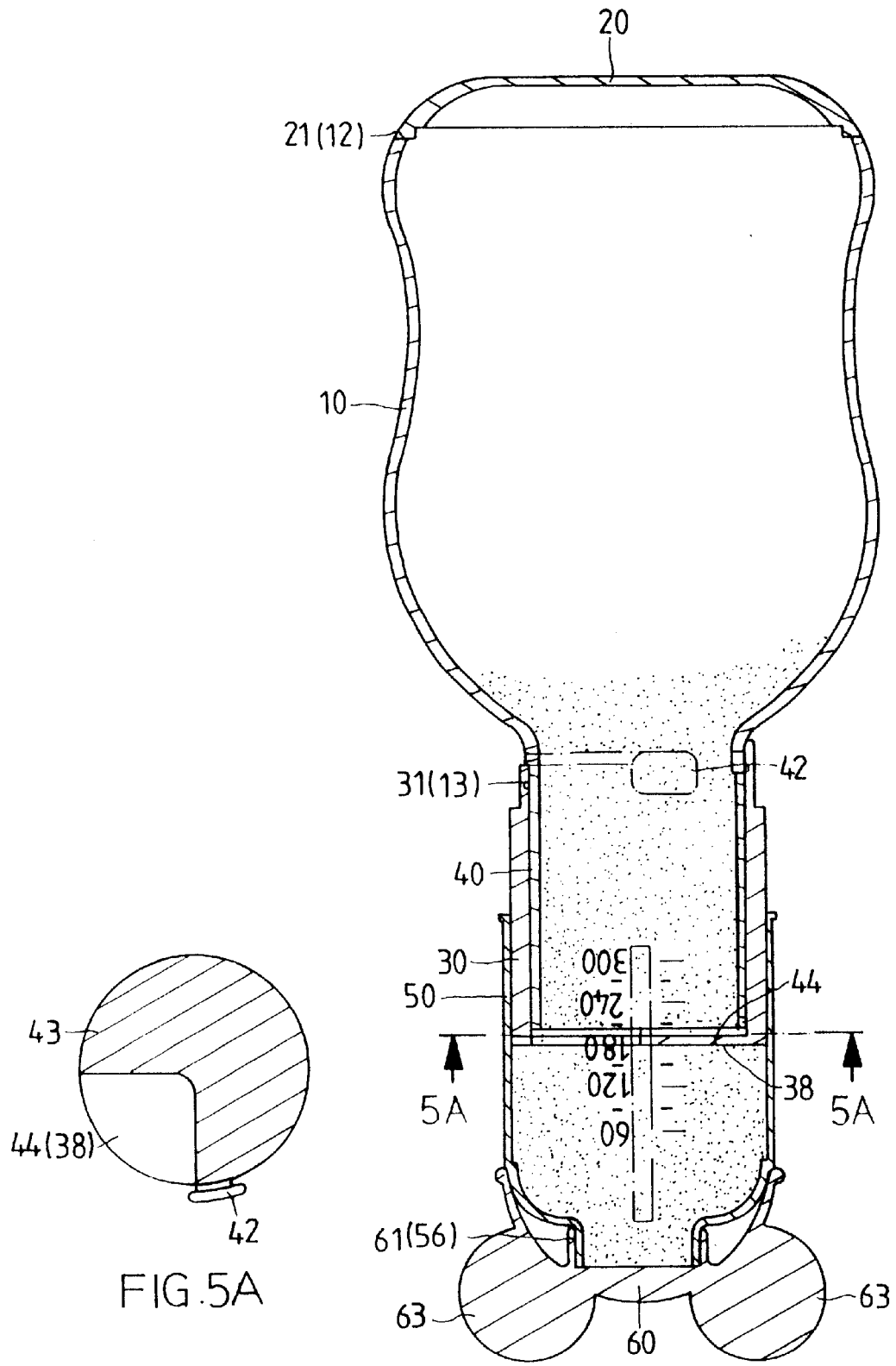
FIG. 5 is a sectional assembly view of a powdered milk measuring container with milk powders therein.
FIG. 5A is a sectional view taken along line 5A—5A of FIG. 5.

Referring to FIGS. 5 and 5A, the milk powders in the measuring bottle 50 is blocked by the cover 60. The user can hold the swivel buttons 63 to open the cover 60.

Figure 4:
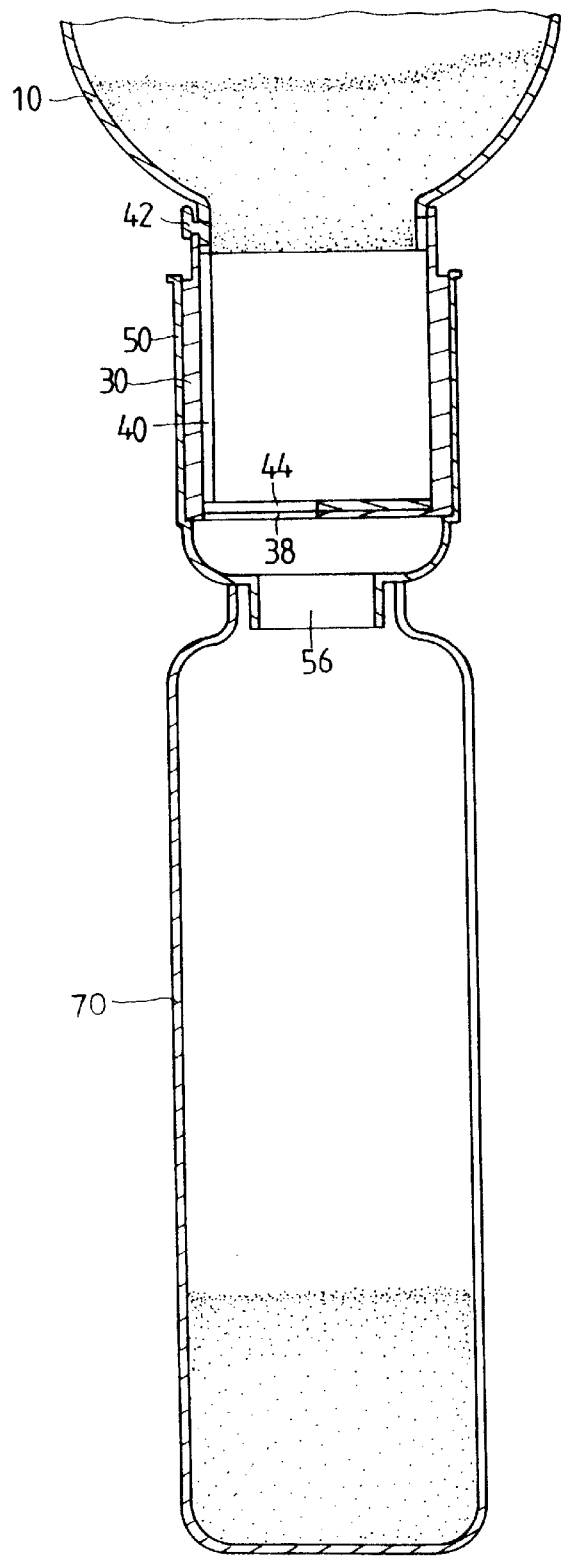
FIG. 4 is a partially sectional assembly view of a powdered milk measuring container of a preferred embodiment and a feeding bottle while a cover is removed.

Referring to FIG. 4, the cover 60 is removed. The bottle mouth 56 is inserted in a mouth of a feeding bottle 70. The predetermined amount of milk powders in the measuring bottle 50 is poured into the feeding bottle 70 until the measuring bottle 50 is empty.

The invention is not limited to the above embodiment but various modification thereof may be made. Further, various changes in form and detail may be made without departing from the scope of the invention.

I claim:

1. A powdered milk measuring container comprises:
   a base dish, a hollow vessel disposed on the base dish, a hollow cylinder disposed on the hollow vessel, a control device disposed in the hollow cylinder, a measuring bottle enclosing the hollow cylinder, and a cover covering the measuring bottle,
   the base dish having an internal periphery thread,
   the hollow vessel having an external periphery thread on a bottom of the hollow vessel engaging with the internal periphery thread, an outer threaded mouth on a top portion of the hollow vessel, and an interior,
   the control device having a bottom ring, a lateral plate, and an upper plate having a notch, the hollow cylinder having a lid, a slot formed on the lid, a recess hole formed on the lid, a protruded post disposed on the lid, a clip dent formed on an outer periphery of the hollow cylinder, a plurality of nicks formed on the outer periphery of the hollow cylinder, and an inner threaded bottom having a groove, the measuring bottle having a bottle mouth, a spiral column, a recess, an elastic plate, a clip block, and a hook extended from the elastic plate, the cover having an inner sleeve, a bottom flange, and two swivel buttons, the groove receiving the lateral plate, the inner threaded bottom engaging with the outer threaded mouth, the protruded post inserted in the recess, the hook engaging with the clip dent, and the clip block engaging with the nick.

2. A powdered milk measuring container as claimed in claim 1, wherein a graduation is formed on the measuring bottle.

* * * * *